March 3, 1936.  D. A. NEVIN  2,032,629
CARD INDEXING MACHINE
Filed July 11, 1932  9 Sheets-Sheet 3
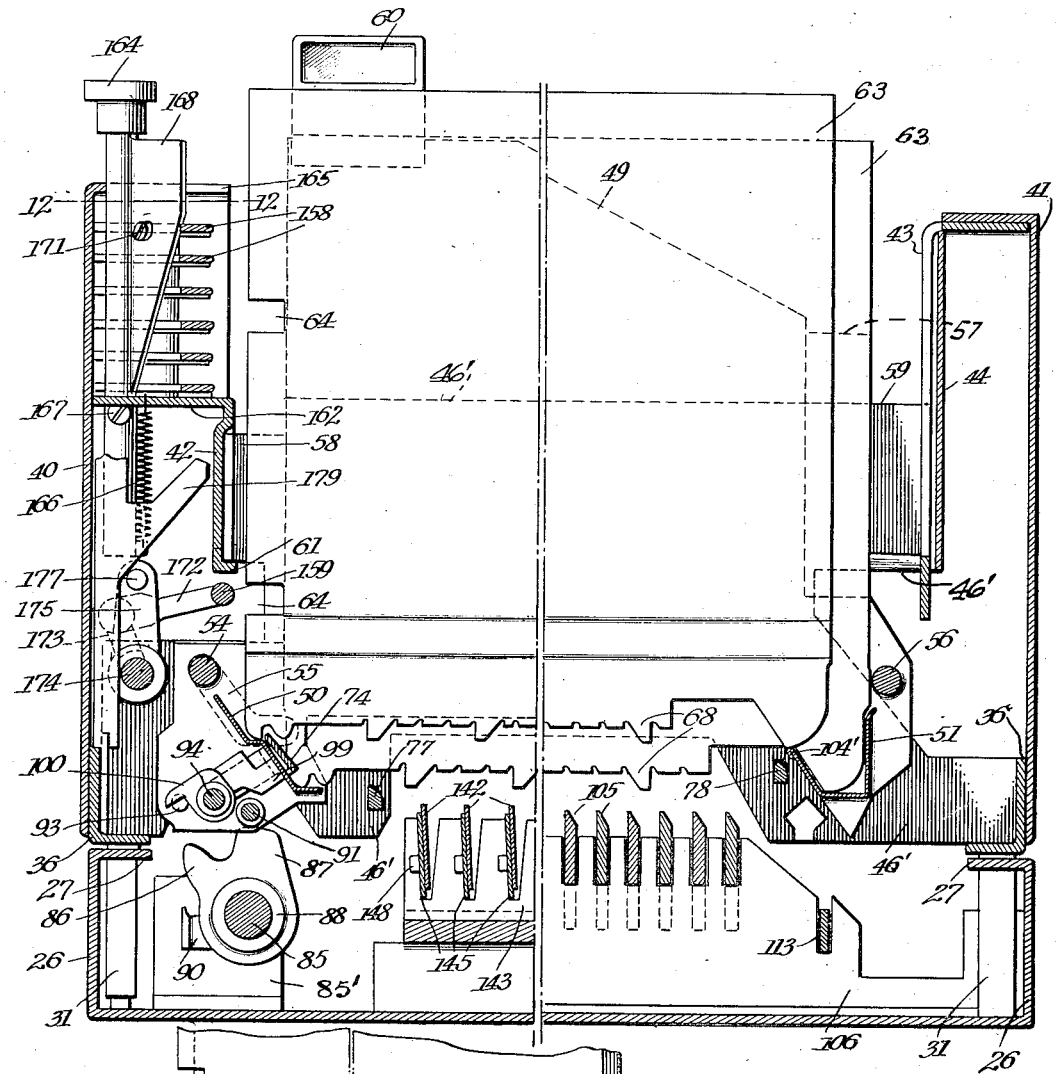
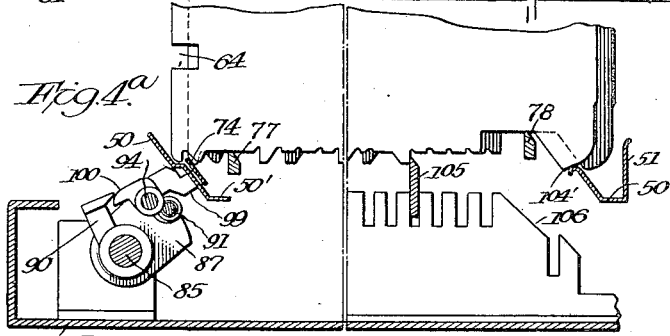
Inventor
Donald A. Nevin,
Attorney

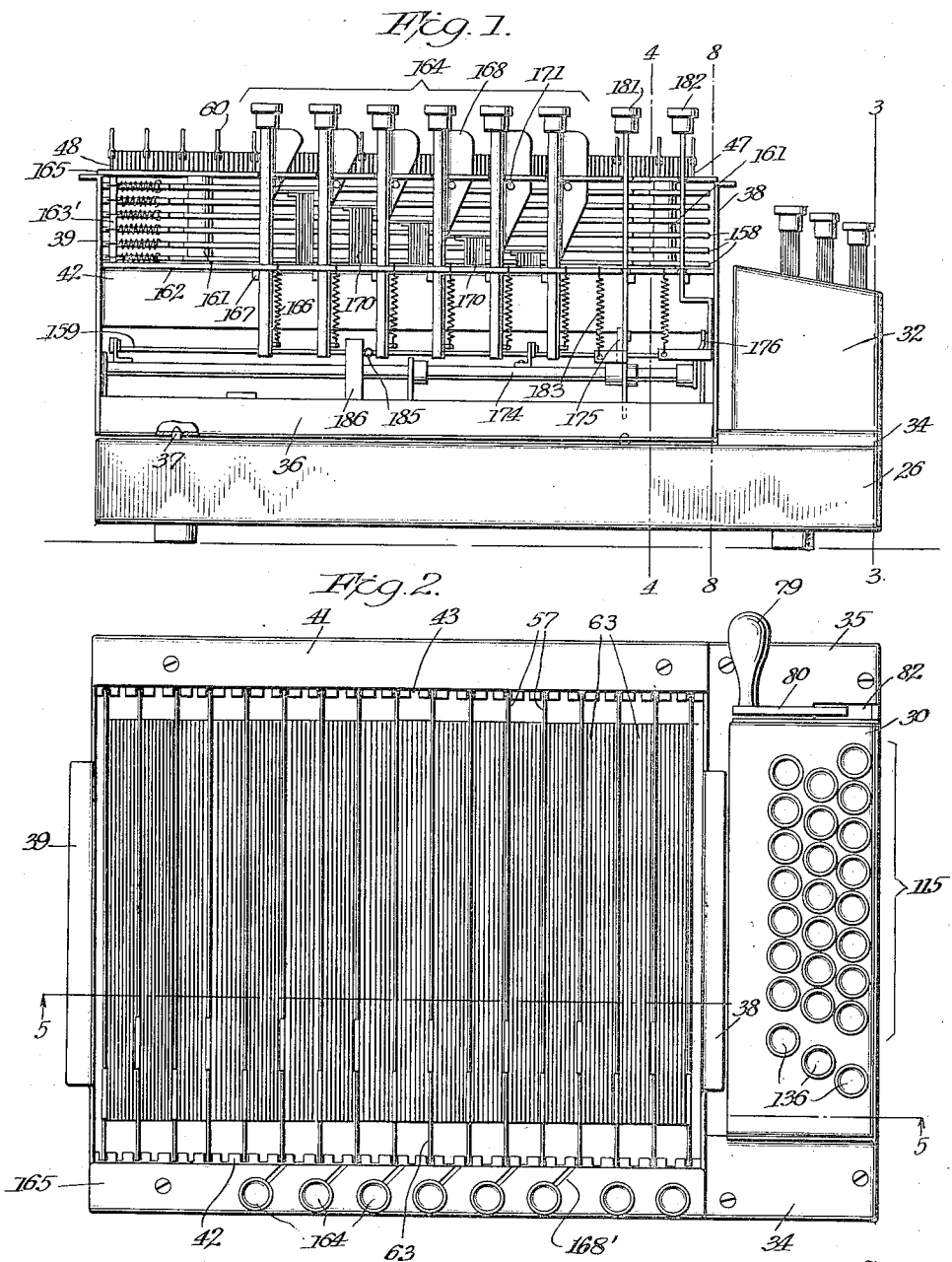

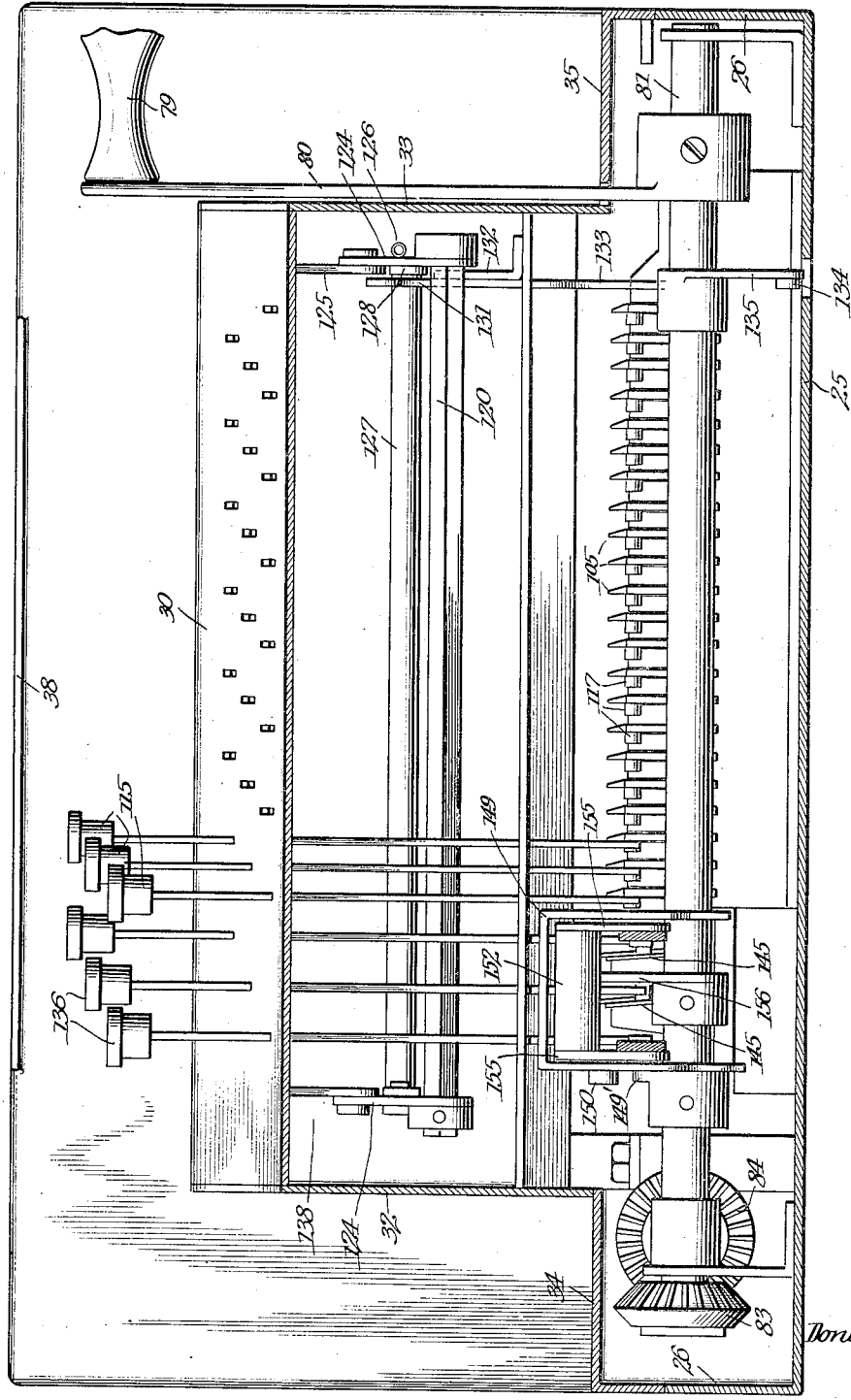

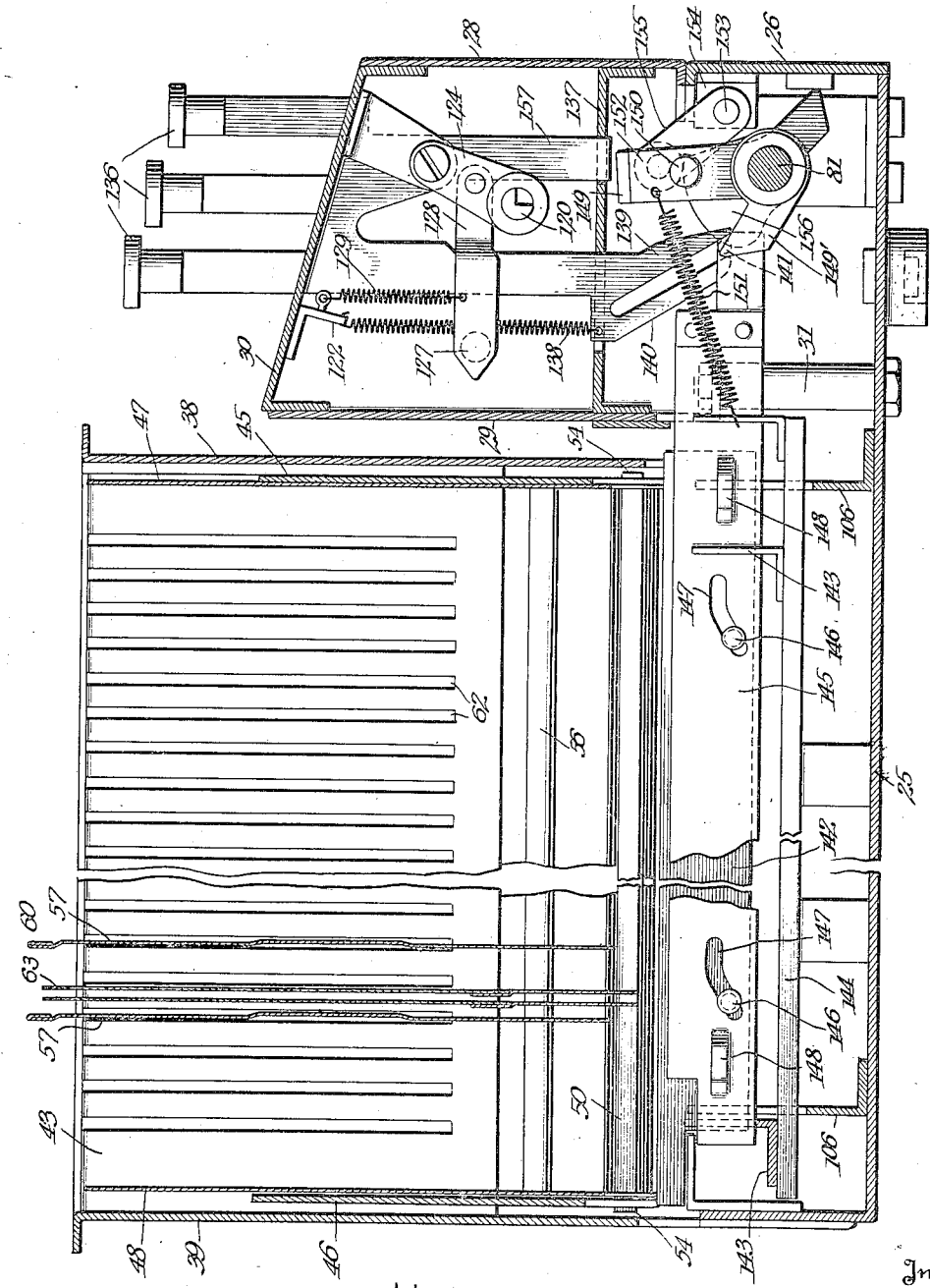

March 3, 1936.  D. A. NEVIN  2,032,629
CARD INDEXING MACHINE
Filed July 11, 1932  9 Sheets-Sheet 5
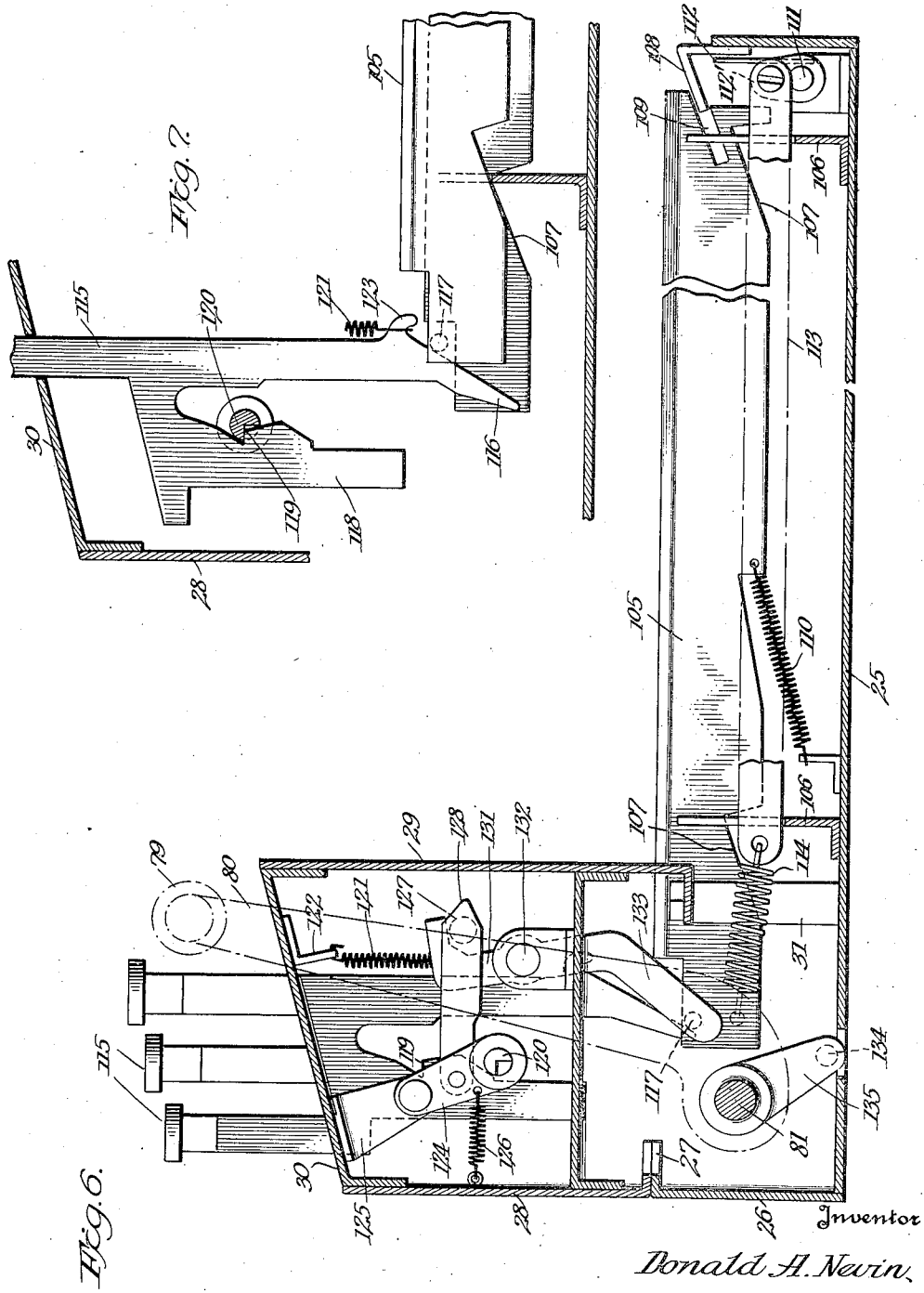

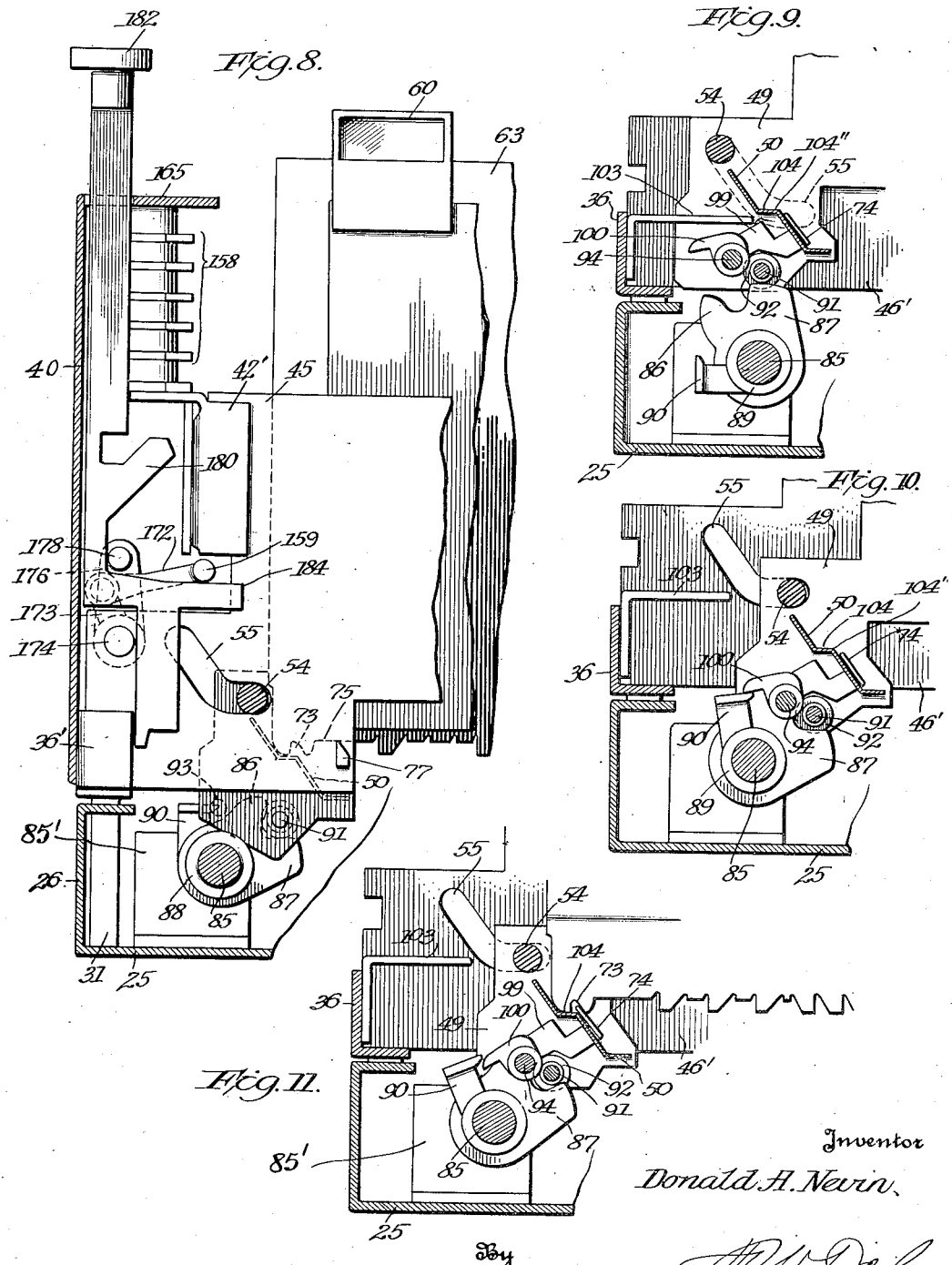

March 3, 1936.    D. A. NEVIN    2,032,629
CARD INDEXING MACHINE
Filed July 11, 1932    9 Sheets-Sheet 7
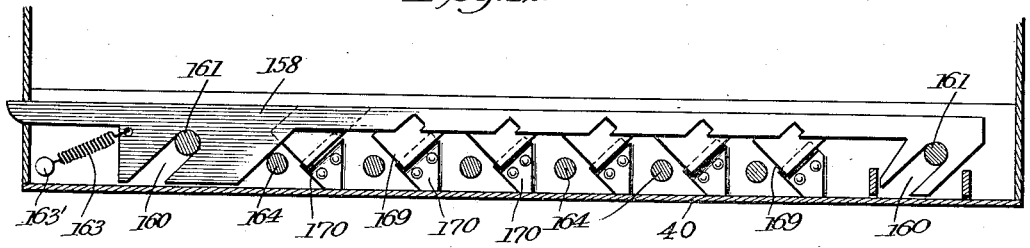
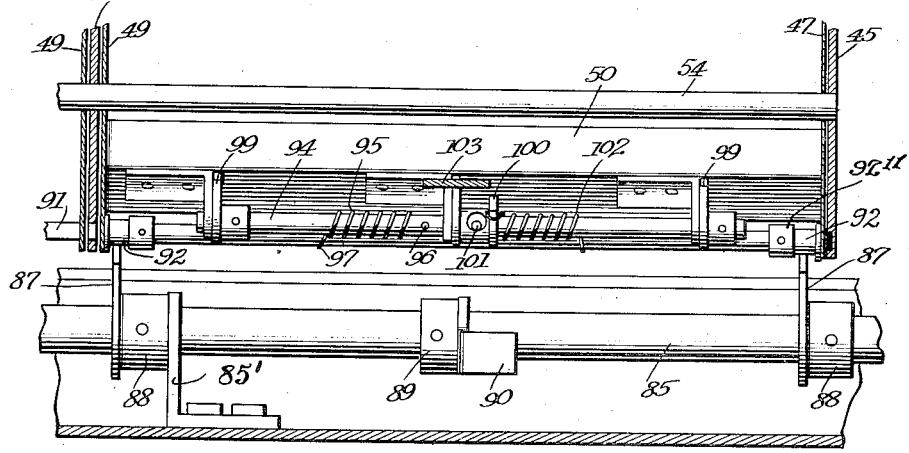
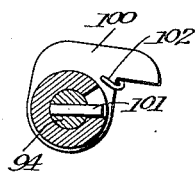
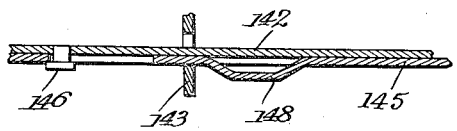
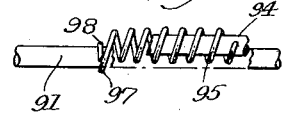
Inventor
Donald A. Nevin,
By
Attorney March 3, 1936.　　　　D. A. NEVIN　　　　2,032,629
CARD INDEXING MACHINE
Filed July 11, 1932　　　9 Sheets-Sheet 8
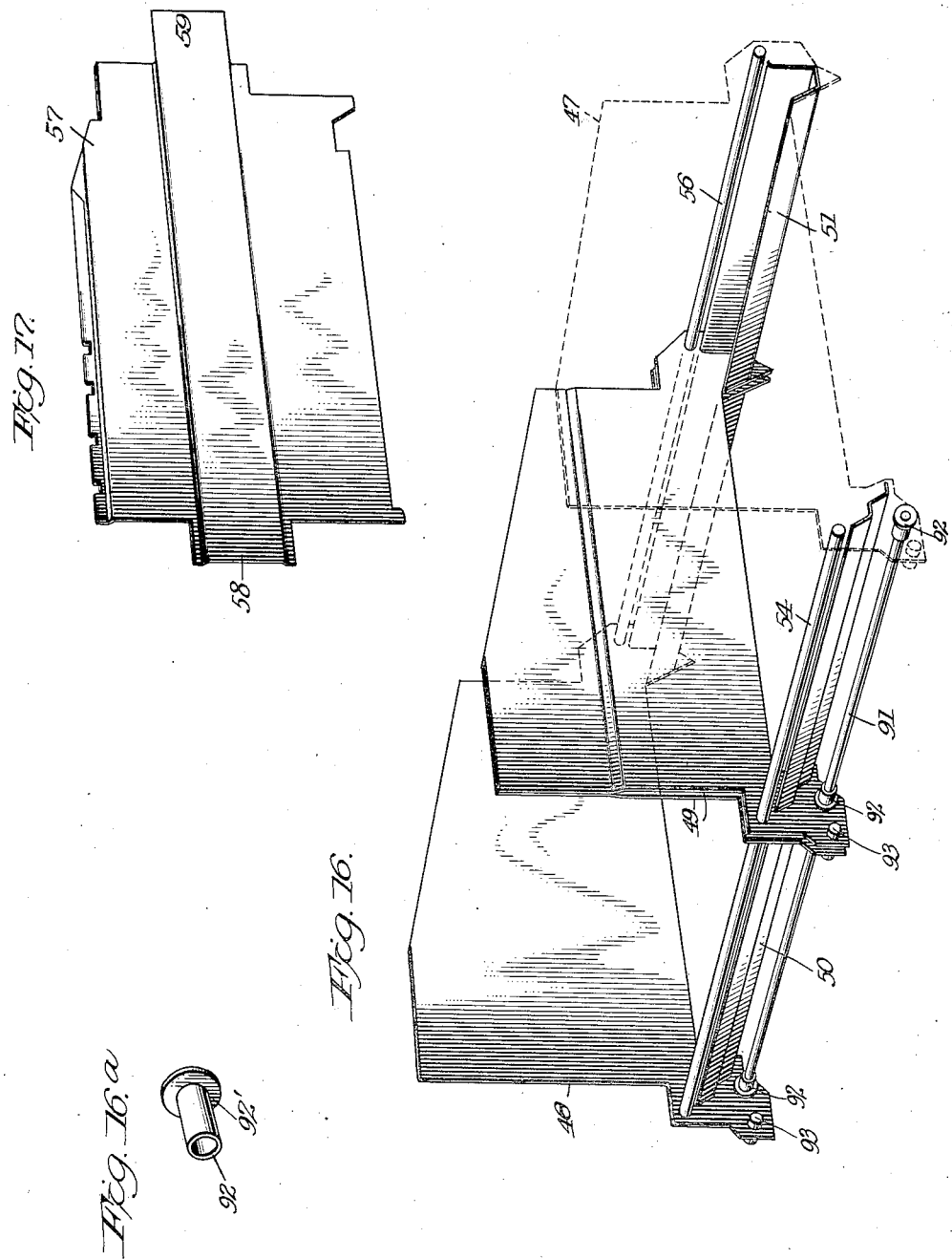
Inventor
Donald A. Nevin
By
Attorney

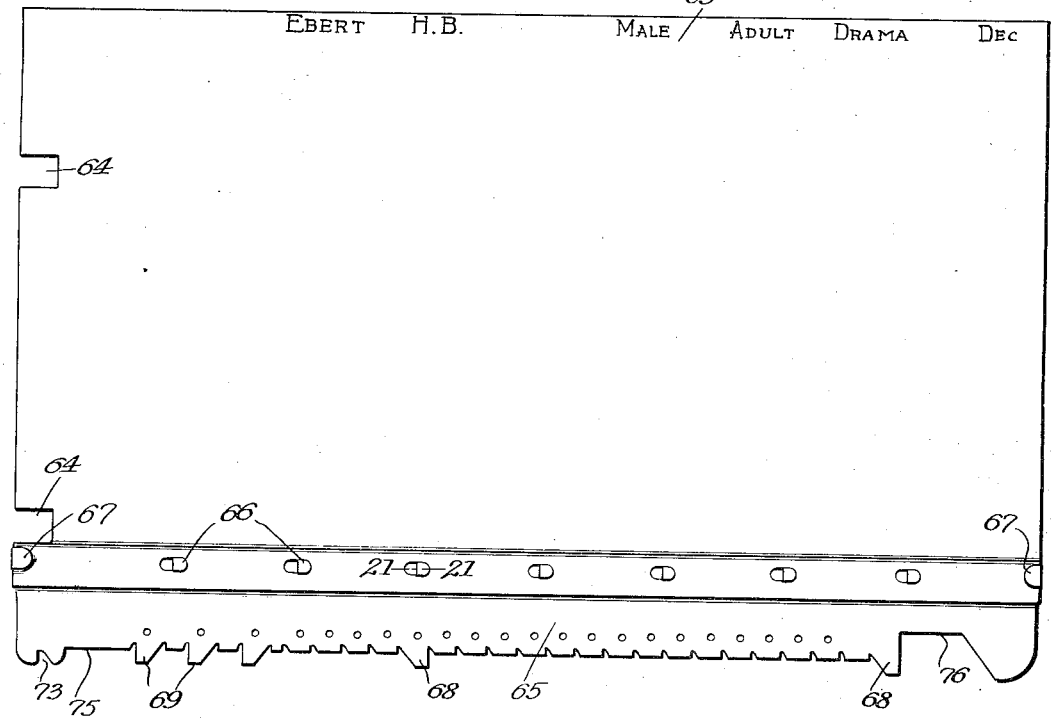
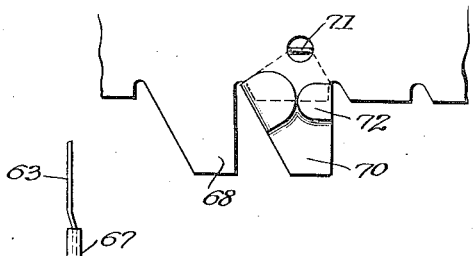
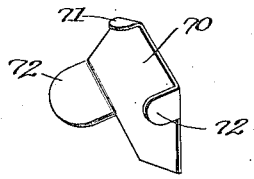
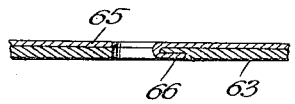

Patented Mar. 3, 1936

2,032,629

UNITED STATES PATENT OFFICE 2,032,629

CARD INDEXING MACHINE

Donald A. Nevin, Waynesboro, Pa., assignor, by mesne assignments, to J. G. Mumma, Waynesboro, Pa.

Application July 11, 1932, Serial No. 621,973

39 Claims. (Cl. 129—16.1)

My said invention relates to a card indexing mechanism and it is an object of the same to provide improved means for selecting groups of cards out of a large number of cards in a tray or container and for then selecting sub-groups of cards from such selected groups with speed and accuracy. In some respects the invention herein disclosed is similar to those shown in my Patents Numbers 1,662,534 March 13, 1928, 1,739,168 December 10, 1929, and in my application Serial No. 322,943 filed November 30, 1928, now patent, No. 1,874,335, August 30, 1932, to which reference may be had for clearer understanding of such features. In the operation of the machine described in said latter patent it is necessary to use a classifying lever as well as an operating handle audit lever for the purpose of classifying or elevating groups of cards having a common characteristic. It is an object of my present invention to provide means for selecting cards of a common class without the use of a classifying lever mechanism, thereby greatly reducing the cost of the machine and increasing the speed of operation.

Another object is to provide means for returning the key-operated selection rails under strong dependable spring pressure and means for disconnecting such mechanism from operative relation with the keys so as to require only an extremely light touch to depress the keys.

Another object is to provide means for preventing depression of certain keys when the operating handle is in its normal position, such keys being operable only after the operating handle has been drawn forward to its extreme operative position, thus compelling inexperienced operators to follow the proper sequence of operations for so preventing damage to the machine.

Another object is to provide means for positively returning such depressed keys simultaneously with the return of the operating handle even though the springs for returning them should not operate properly.

Another object is to provide a card with a metal margin or base permanently attached thereto for preventing damage to the card due to wear or abuse of the same, while retaining the desired writing space on the card proper.

Another object is to provide relatively simple means for operating a full return rail for all cards by key depression.

Another object is to provide means for a secondary (or tertiary) classification of the cards after the primary selection or group segregation has been made, such means comprising rails similar in operation to the return rail but adapted to act selectively on less than the total number of cards.

Referring to the drawings etc.,

Fig. 1 is a side elevation of the machine with a side plate removed.

Fig. 2, a plan of the same.

Fig. 3, a partial front elevation on line 3—3 of Fig. 1.

Fig. 4, a vertical section on line 4—4 of Fig. 1, with parts omitted, showing two positions of the card holders.

Fig. 4a, a similar view, showing a third position.

Fig. 5, a longitudinal section on line 5—5 of Fig. 2 looking in the direction of the arrow.

Fig. 6, an elevation of the opposite side of the machine with the card tray and the side plates of the mechanism keys removed.

Fig. 7, a detail illustrating the operation of a key on one of the longitudinally slidable selection rails.

Fig. 8, a fragmentary vertical section of the machine on line 8—8 of Fig. 1 showing particularly the return rail mechanism.

Figs. 9, 10 and 11, partial vertical sections of the tray and mechanism case illustrating various positions of the mechanism for raising and lowering the card holders and for holding the selected cards in selected or isolated position.

Fig. 12, a fragmentary horizontal section on line 12—12 of Fig. 4, showing a supplementary return rail.

Fig. 13, a fragmentary side elevation partly in section of parts of the card holder and coacting devices.

Fig. 13a, a detail of parts shown in Fig. 13.

Fig. 14, a vertical section of a shaft shown in Fig. 13, and parts carried by said shaft.

Fig. 15, a horizontal section of a portion of a rejection rail, such as those shown in Fig. 5.

Fig. 16, a perspective of the card holder.

Fig. 16a, a detail of a part shown in Fig. 16.

Fig. 17, a perspective of a partition in the same.

Fig. 18, an elevation of a card.

Fig. 19, an enlarged detail of a card having an attachable tooth secured thereto.

Fig. 20, a detail of such a tooth prior to attachment.

Fig. 21, a partial horizontal section of a card on line 21—21 of Fig. 18, and

Fig. 22, a partial side elevation of Fig. 18.

In the drawings reference character 25 indicates the bottom or base member of the mechanism case which is provided with side and front members 26 bent upward from the bottom plate or otherwise secured thereto and in the present embodiment of the invention these members are bent inward to provide horizontal flanges 27. At the forward end of the mechanism case there is an upward extension comprising front and rear plates 28 and 29 resting respectively on a flange 27 and on one or more supports 31 carried by the base plate while the key board 30 is secured to plates 28—29. The ends of the upward extension are closed by side plates 32—33 (Fig. 3) and openings beyond the opposite ends of said upward extension are closed by removable plates 34—35.

A card tray rests on longitudinal flanges 27—27 back of said extension, the card tray comprising lower L-shaped side bars 36 resting on said longitudinal flanges 27 of the mechanism case and positioned with respect thereto by dowel pins 37 (Fig. 1) entering holes in the bottom flange of either side bar 36. The card tray also includes a front plate 38, a rear plate 39, side plates 40 and 41 vertically slotted or grooved L-shaped plates 42 and 43 spaced upwardly from the side bars (the plate 42 being here shown as slotted while plate 43 is grooved or corrugated), a slot cover plate 44 back of plate 43, a front frame member 45 having the substantially L-shaped plates 42—43 and 36—36 secured thereto as by spot-welding and a rear plate 46 generally similar to plate 45 and having similar parts of the frame secured thereto. The tray also includes one or more intermediate partitions 46' (Fig. 4) secured to the plates 36. Ears are shown at 36' and 42' (Fig. 8) for convenience in securing parts together.

Within the card tray there is located a card holder which in this case is of sufficient size to hold all the cards in the tray but which may be made in several independent parts if desired. The card holder (Fig. 16) as herein illustrated comprises a front plate 47, a rear plate 48 and one or more intermediate sets of partition plates 49 straddling the plate 46' (see Fig. 13) and slid down thereover, the plates 47, 48 and 49 being secured to longitudinal strips 50—51 of sheet-metal which form the bottom of the card holder, the strips 40 and 51 bearing at their ends against the respective plates. It will be understood that the transverse members 46' and 49 of the tray and holder may be provided in any suitable number depending on the length of the card holder or there may be only one front and one rear cross member of the holder if the same is short. A rod 54 passes through and is secured to the transverse parts 47, 48 and 49 at the left side of the machine, and moves in angular slots in the adjacent frame members 45, 46 and 46' of the tray, the shape of these slots being indicated at 55 in Figs. 4 and 8 to 11. As hereinafter explained the card holder has a movement transversely of the tray and also a movement up and down, the direction of which movement is determined by the shape of the slots 55 and by the shape of an edge at the right-hand end of each of the transverse inner frame members of the tray as indicated in Fig. 4 for member 46', contacting with a longitudinally extending rod 56 which is rigidly secured to the right-hand ends of the transverse members 47, 48 and 49 of the card holder.

The card holder is subdivided into a plurality of variable compartments by means of readily removable partitions 57 (Fig. 17) having relatively narrow lateral extensions or wings at 58 and 59 (Fig. 4) to engage the slots in plates 42 and 43 respectively. The partitions and the cross members 47, 48 and 49 may be provided with removable tabs 60 as in my patent, 1,874,335 above referred to, such tabs carrying indicia of a characteristic of the cards in the corresponding space of the card holders and for the purpose of positioning the tabs at different points in the width of the machine the partitions may be provided with notches as disclosed in said patent, as may also be the cross members of the card holder. The wings 58 of the partitions rest on a flange 61 of plate 42 and the wings 59 are supported by the lower ends of the slots 62 in plate 43 (Figs. 4 and 5), and it will be seen therefore that the removable partitions do not take part in the vertical and lateral movements of the card holder or card holders. At their lower ends the partitions are cut away so as not to interfere with other parts of the mechanism but the shape of their lower ends has no functional significance.

Fig. 18 shows a card 63 having at its upper end a space for legends, which legends are exposed when the card is selectively elevated above others of the set. This card may have one or more notches 64 at any suitable height along its left-hand side for cooperation with secondary or tertiary selective means hereinafter described. At its lower end it is provided with a margin 65 made of sheet metal, such as sheet-steel. This metal base may be attached to the card by pasting or in any other suitable manner, but preferably by means of tongues 66 punched out of the metal and inserted through holes in the card and then bent over to clamp the parts together the tongues being pressed into the paper of the card to make a smooth joint, for which purpose also the card and the base are preferably offset so that the cards will not interfere with each other (see Fig. 22). Ears 67 may be provided at the ends of the metal strip which ears are bent over the adjacent edge of the card. At its lower end the strip is originally so cut as to provide a plurality of teeth 68 facing to the right and a smaller number of teeth 69 facing to the left. By suitable means these teeth may subsequently be removed so as to leave only such teeth as correspond to the indications made on the card for purposes of selection. For example, the tooth 68 shown near the midlength of the card may be related to an indication of a surname beginning with "A", so that when the means hereinafter described is operated to offset cards having such a tooth 68 so located all these cards will be offset relatively to the other cards of the set, thereby isolating the cards having such names thereon from the remaining cards of the set. In similar manner the other teeth may be correlated to other characteristics of persons or to dates or localities or to any other indicia that it may be found desirable to place on the cards of a set.

After a card has had teeth removed therefrom it may become desirable to replace some of such teeth either because they have been removed by accident or because the card is to be put to a new use or because the status of the person or thing indicated by said card has changed (e. g. a junior in high school becomes a senior or a single person marries, etc.). In such case it is not necessary to make new cards since I provide tabs such as indicated at 70 which may be attached to a card in place of a removed tooth by positioning the tab as indicated in Fig. 19 and bending its ears 71 and 72 so as to hold it securely in place, when its tooth will function in the same manner as a tooth of the original set.

In addition to the features described the card has at its lower left-hand corner a notch 73 which coacts with a detent 74 (Figs. 4, 9, 10 and 11). Extended horizontal portions at the lower edge of the card at 75 and 76 rest respectively upon bars 77 and 78 extending from end to end under the card holders which bars are fixed to the parts 45, 46 and 46′ in the device as here illustrated, these bars supporting the cards for free lateral movement for purposes hereinafter described.

The means for moving the card holders laterally and vertically to off-set the cards for producing the primary selection comprise an operating handle 79 (Figs. 2 and 3) mounted on the audit lever 80 fixed to a rock-shaft 81 which extends across the front end of the machine. The movement of the operating handle is limited by the ends of the slot at 82 in the frame. At its left-hand end the shaft 81 carries a beveled gear 83 meshing with a beveled gear 84 on a shaft 85 which extends the full length of the machine and is mounted in brackets 85′ (Figs. 4, 8, 11, 13). The shaft 85 is provided adjacent each cross-member of the card container or containers with a pair of horns 86—87 on a collar 88, said shaft being also provided intermediate the devices just described with collars 89 carrying trips 90. The horns 86 and 87 coact with a rod 91 passing under the cross-member 46′ and mounted in plates 47, 48 and 49 of the card container, said rod being shown as provided with anti-friction sleeves 92 each having an annular flange 92′ (Fig. 16a), said sleeves being respectively held in place by the horns 86 and 87 on one side of a flange 92′ and by cross-members 47, 48 or 49 on the other side of said flange. Collars 92″ may also be pinned to the shaft for this purpose, as shown in Fig. 13, these collars serving to hold the sleeves 92 in place when the machine is being assembled. In servicing a machine it is often necessary to remove a tray bodily (there being normally five trays in a machine) and in such case sleeves 92 might become displaced out of alinement with horns 87 in the absence of collars 92″. It will be seen that the horn 87 has a relatively long upper bearing surface by means of which the card holder is securely held in its extreme upper and leftward position in Figs. 4 and 9 where the pin 54 is at the end of angular slot 55, the other parts of the card holder, such as rods 56 and 91, rock shafts 94, bottom members 50, 51 and cross-members 47, 48 and 49 being of course in analogous positions. When the shaft 85 is turned clock-wise the horn 87 will ride out from underneath rod 91, permitting the card holder to descend by gravity to a position where the rod 91 is between horns 86 and 87, after which further rotation of the shaft in the same sense will cause horn 86 to force the shaft to the right, carrying with it the card holder until the pin 54 reaches the end of the angular slots 55. To the left of the rod 91 the cross-members of the card holder are provided with studs 93 (Figs. 4, 8 and 16) which cooperate with the horns 86 in returning the card holder, there being a slight clearance between the studs and the horns 86, as also between the rod 91 with its bearing roller 92 and the horns 87 in their extreme clock-wise position. The horns 86 serve to initiate the return movement of the card holder which is completed by horns 87 which pass underneath shaft 91 on completion of such return, so as to support the card holder positively.

Operating means for the detents 74 are located adjacent the rod 91. Such operating means comprise a pair of rock-shafts 94, one at each side of the central cross-member 46′ and terminating short of the respective end members of the card holder, said shafts being journalled in bearings secured to the left-hand longitudinal frame member 50. A spring 95 is coiled about each of said shafts, one end of the spring being secured to the shaft by a pin 96 and the other being wound around the rod 91, as shown at 98 (Fig. 13a), whereby the torsion of the spring tends to turn the shaft 94 counterclockwise in Figs. 4 and 9–11. The shafts 94 have secured thereto arms 99 which extend through holes in the frame member 50, the upper edges of these arms striking against the upper edges of said holes to limit the counterclockwise movement of the shaft. The ends of the arms are attached to the detent 74 which, in the form of the invention here illustrated, extends the full length of the card holder. The shafts 94 also carry lost-motion rock-arms or triggers 100 (Figs. 4, 9 to 11, 13 and 14). These triggers are loosely mounted on the shaft, their movement relative to the shaft being limited by pins 101 permanently inserted in said shaft with one end entering slots in the hubs to which they are attached, the triggers being spring-impelled in clockwise direction by means of springs 102 coiled around shaft 94, each secured at one end to shaft 91 and at the other end to said trigger 100. As the card holder nears the lower right-hand extremity of its movement a trip 90 on the shaft 85 comes into position beneath the free end of each trigger 100 and causes the shaft 94 to turn and bring the detent 74 into its lowermost position as illustrated in Figs. 9 and 10. In the intermediate position of the card container, whether the same is moving up or down, the detent 74 is in the active position of Fig. 11. In the upper left extreme position the detent is again withdrawn due to the fact that an arm 99 on each shaft strikes a fixed abutment 103 secured to a side member 36 of the card tray and turns the shafts in a clockwise sense.

Lost motion of the trigger 100 is necessary to prevent interference between this trigger and the trip 90, as it will be seen that when the return movement of the card container and its operating parts begins the point of the trip will first pass from under the trigger due to the lost motion between horns 86—87 and members 91—93 after which the horizontal travel of the card container is more rapid than the horizontal component of travel of trip 90 so that the trigger 100 again passes slightly underneath the beveled edge of the trip 90 as shown in Fig. 11. When the lost motion trigger strikes the trip in the return movement of the holder it merely yields circumferentially to a slight extent without causing damage, and is returned to normal position by coil spring 102 before the parts reach the position indicated in Fig. 9.

*First selection*

In the normal operation of the card holder, the card holder with all the cards moves downward and to the right and then back again. In such movement the cards are carried downward with the container until they strike the rods 77 and 78 and then laterally to the full extent of movement of the container. The mechanism whereby certain cards are offset with respect to the container so as to be supported in the position of the foremost card in Fig. 4, with the lower left-hand edge of the card held on a horizontal ledge 104 (Figs. 9 to 11) of the longitudinal holder frame member 50 and the lower right-hand corner resting on the upper left-hand edge of the frame member 51, as indicated at 104' (Fig. 4) will now be described. This mechanism comprises longitudinal selection rails 105 (Figs. 3, 4, and 6) for engagement with teeth 68 (Figs. 4, 18 and 19) on the lower margin of the cards, these selection rails being guided in combs 106 for movement longitudinally of the mechanism case. The selection rails are provided with front and rear cam edges at 107 for causing them to move up and down in the course of their lengthwise movement and a guide 108 at the rear end of the machine enters a slot at 109 in each selection rail to prevent the rails from rising out of correct position. Springs 110 serve for retracting the selection rails to normal position. A shaft 111 at the rear of the mechanism casing carries a blade 112 adapted to bear against the rear ends of any selection rails that have been moved back and upward into operative position. This shaft 111 has a rock-arm 112' to which there is attached a link 113 connected by means of a strong spring 114 to the audit lever 80. In this way a heavy pressure can be brought to bear on any and all selection rails that are in operative position at a time when the audit lever is drawn forward, thus rendering it possible to use only very light springs 110 for the individual selection rails and so making it easier to position the selection rails by means of the keys 115 with the obviously desirable result of rendering it possible to operate the keys by a lighter touch than has heretofore been effective.

The selection keys may be lettered or numbered or may bear other appropriate legends indicating characteristics noted on the cards and according to which the cards are classified, in any desirable manner. As will be seen more particularly in Fig. 7 each key 115 has a single angularly extending projection 116 at its lower end providing a cam edge for acting on a pin 117 on the respective selection rail to move it against the tension of its spring 110 and each key also has a leg 118 with a shoulder at 119 for engagement with a locking bail 120 having a 90° segment milled out to provide a very effective detent for engagement with the shoulder 119 of the various keys when the keys are depressed. Springs 121 serve to return the keys to normal elevated position, these springs being attached at one end to brackets 122 on the top plate 30 and at the other end engaging under lugs 123 on the keys. As each spring has no other duty than to elevate its key when the detent is released it may be a very light spring, this also conducing to lightness of the touch necessary for depressing a key. The bail 120 extends across the entire group of selection keys, each of which is provided with a shoulder 119 as more fully explained and illustrated in my Patent 1,662,534, so that a single bail may serve for holding any or all of the selection keys in depressed position. The bail is suspended at its ends by means of links 124 pivoted to a bracket 125 and normally drawn toward the front of the machine by one or more springs 126 into position to engage the shoulders 119. A rod 127 is connected to the links 124 by links 128, Figs. 5 and 6, the rod 127 and links 128 being normally drawn upward by one or more springs 129 attached at their upper ends to brackets 122 (Fig. 5). A lever 131 pivoted at 132 has its end formed as a hook extending over the rod 127 while its lower portion 133 lies in the path of movement of a stud 134 on a rock-arm 135 fixed to the shaft 81 to rock therewith, thus moving the lever 131 on its pivot to push the rod 127 rearwardly, carrying with it the links 128 and 124 and the selection key locking bail so as to release any selection keys that are held in depressed position.

*Second selection*

In addition to the selection keys my device provides three rejection keys 136 at the left-hand end of the bank of keys on the keyboard, both the selection keys and the rejection keys being guided near their lower ends in a plate 137 forming a part of the upward extension of the mechanism case. The rejection keys are normally drawn upward by springs 138 secured to bracket 122 and are each provided at their lower end with a pair of downward extensions 139 and 140, defining between them a cam slot in which a pin 141 moves for the purpose of imparting longitudinal movement to an operating slide for a rejection rail 142, (Figs. 4, 5 and 15). The rejection rails are guided in combs 143 on a support 144 fixed to the mechanism casing. Each rejection rail has a combined vertical and oscillatory movement which is imparted to it by an operating slide 145 connected to its rejection rail by means of pins 146 on each of said rails, the pins extending through slots 147 in said operating slides. It will be seen that as the operating slides are reciprocated by vertical movement of their keys the pin and slot connections will move the rejection rails vertically. For imparting oscillatory movement to the rejection rails each operating slide has on one side thereof two or more cams 148 (Fig. 15) which, as an operating slide is reciprocated, bear against the adjacent teeth of the respective combs so as to swing the slide to the right, this being permitted by the shape of the teeth of the comb as clearly shown in Fig. 4. Such movement causes the rejection rail to bear on one of the teeth 69 of the card shown in Fig. 18 so as to move to the right cards that have been offset to the left, as shown in the case of the foremost card in Fig. 4. This action necessarily takes place while the cards are in their lowermost position. By appropriately marking the keys with indications common to a considerable number of cards in the card tray it is possible to reject a large number of the cards that have been primarily selected, the teeth 69 on the cards being so arranged that all cards are rejected except such as have had teeth removed at points correlated in position to the rejection key which is depressed. The rejection keys are not locked down by the bail 120 and therefore will be returned to upper position immediately after their actuation, this being due to the tension of their springs 138.

In order that the operator may be forced to perform the desired selecting operations in proper sequence I provide a locking bail 149 (Figs. 3 and 5) which prevents depression of any rejection key until after the operating handle has been swung to its extreme forward position. This locking bail is loosely pivoted on shaft 81 and is actuated by a rock-arm 149' fixed to said shaft, which rock-arm engages a stud 150 on the locking bail for the purpose of moving it clock-wise against the tension of a spring 151. It will be seen that the arm 149' can only engage the pin 150 to remove bail 149 from locking position after the audit lever has accomplished the greater part of its movement for shifting the card holder or holders downward and to the right. Bearing in mind that the card holders must be shifted so far that the cards shall have assumed their lowest position in order that the elevated selection rails can reach the teeth 68 of the cards, and remembering also that the card holder must have been shifted at least substantially to its extreme position toward the right of the machine so that the primary selection of cards shall have been initiated by offsetting of such cards as have teeth which engage elevated selection rails, it will be evident that the operation of the rejection keys should not occur until the operating handle has been swung forward and downward to the full extent of its movement whereby also the card holder or holders shall have been moved downward and to the right to the full extent of their movement in such directions, and such selection rails as have been elevated, released by withdrawing detent bail 129, and been positively forced to their lowered position by means of strong spring 114 and link mechanism previously described, hence the delayed operation of arm 149'.

Means are provided for positively elevating the rejection keys, this taking care of any situation where a spring 138 may lag or be temporarily disabled and also permitting the use of a relatively light spring 138 for elevating these keys. The means for elevating the rejection keys positively comprises a cylinder 152 (Figs. 3 and 5) pivotally supported at 153 on brackets 154 by means of a pair of rock-arms 155. A cam 156 fixed to shaft 81 permits the cylinder 152 to fall under the influence of gravity as the operating handle is rocked forward but upon return of said lever the cam 156 elevates the cylinder and thus forces it into contact with the lower ends of legs 157 of any rejection keys that may have been depressed.

*Third selection*

My machine herein disclosed embodies selecting means which may be regarded either as secondary to the primary selection made by the selection rails or as tertiary if utilized after a primary selection by the selection rails and a secondary selection by the use of the rejection rails, it being understood that the selection by means of the rejection rails may be omitted whenever desired. This last-named selection is also a rejecting operation in that certain cards previously selected are returned to normal position in the set of cards, leaving only those cards offset which have certain characteristics relatively to which the selection is being made. For this purpose the cards are provided with such notches as are shown at 64 in Fig. 18, which notches may be located at suitable heights for coaction with similarly located return rails. The return rails are of two varieties, those of one variety being illustrated at 158 in Figs. 1, 4, 8 and 12 while a return rail of different character is shown at 159 in Figs. 1, 4 and 8.

The rails 158 are provided with oblique slots at 160 (Fig. 12) for engagement with posts 161 supported on a laterally extending flange 162 of the L-shaped plate 42 which forms a side member of the card tray, these posts having spaced circumferential notches or slots whereby the rails are held in properly spaced relation. Springs 163 secured at one end to a spring post 163' on flange 162 pull the return rails toward the rear end of the machine into idle position and a series of return keys 164 corresponding in number to the return rails is provided along the side of the machine, each key consisting of a finger piece and a post guided in the flange 162 and in an inwardly bent flange 165 of frame casing 40. Springs 166 serve to hold the keys in their upper position, the upward movement being limited by lugs 167 on the keys striking against flange 162. Each of the keys is provided with a vertical fin 168 bearing against an edge of a flange 169 on its respective rail, said fins being of lengths varying according to the location of the rail to be actuated and said flanges and being supported by brackets 170 (Figs. 1 and 12). Fins 169 are guided in oblique slots 168' (Fig. 2) of flange 165. The upward movement of the respective keys is limited by lugs 171 on said keys.

The return bar 159 may be used in the same manner as the return rails 158 for making a selection by returning such cards to normal position as do not have a notch opposite the position of the return rail and may also be used to return all cards to normal position in the set. This double function is obtained by giving the return rail either one of two different positions prior to its movement to the right. As best shown in Figs. 4 and 8, return rail 159 is mounted on rock-arms 172 which in turn are mounted on rock-arms 173 fixed to a shaft 174. The shaft 174 is provided adjacent its front end (Fig. 1) with a pair of rock-arms 175—176 having lugs such as shown at 177 (Fig. 4) and 178 (Fig. 8) for engagement by cams 179 and 180 on two return keys 181—182 (Fig. 1) having flat bodies guided in flanges 162 and 165, the lower part of key 181 being guided between collars on shaft 174 and the lower part of key 182 being guided between plates 38 and 45 of the card tray and the bent end of plate 36. These keys are normally drawn upward by springs 183 and their upward movement is limited by lugs on the keys as in the case of return keys previously described. Key 182 has a laterally extending arm 184 upon which one end of the rail 159 is normally held in the position shown in Figs. 4 and 8, so that the actuation of key 181 serves for making a selection between offset cards. Now when key 182 is depressed the return rail falls either by gravity or by the action of a spring such as shown at 185 as being fixed to a post 186 on tray member 36 in Fig. 1, (which spring also serves to withdraw the rail from the cards) to a position where the return rail will, when actuated, engage the edges of all the offset cards and return them to normal position in the tray, it being understood that in this case none of the cards have notches opposite such lower position of the return rail for which reason the key 182 is hereinafter designated as a "Full return" key.

*Operation*

In the operation of my device one or more trays are provided with cards, the trays ordinarily having a capacity up to about one thousand cards. It will be understood that trays can readily be removed from the mechanism base and replaced by others. Having positioned a tray operatively with respect to the mechanism by means of the dowel pins 37 one or more selection keys 115 will now be depressed, and their cam edges acting on pins 117 (Figs. 6 and 7) now force the selection rails lengthwise of the mechanism case, whereby they are caused to ride upward by the action of their lower cam edges 107 on the contiguous surfaces of combs 106, the depressed keys being locked down by the bail 120 due to engagement of its right-angle notch with shoulders 119 of the keys.

The operating handle 79 is now swung forward and downward and by means of its connections through shaft 81, gears 83 and 84 and shaft 85, the horns 87 are now caused to ride out from under the shaft 91, thus permitting the card holder to descend by gravity to a point where the mass of cards are supported by the rails 77 and 78 (Fig. 4a) at which time rod 91 will be engaged and forced to the right by the horns 86, thus moving the card holder to the right, carrying with it such cards as are not obstructed by the previous elevation of selection rails; those cards which have teeth 68 appropriately located will be prevented from moving so far to the right as do the other cards, and will be slightly elevated as they climb up over 104' and 104'' (see Figs. 9 and 10).

As the card holder moves downward the triggers 100 strike the trips 90 (Fig. 10) and move the detent 74 down out of the way of the notches 73 in the lower margins of the cards. When the movement of the operating handle is now reversed the trips 90 first move away from the triggers 100 sufficiently to permit them to assume the position shown in Fig. 11, whereby detent 74 returns to position for engagement with notches 73 of the cards, idle motion providing for such engagement to occur before the holder moves to the left and such engagement draws these cards further to the left while the other cards are retained by 104', thereby further offsetting the cards into a position where the lower left-hand corner of a card rests on a horizontal ledge 104 of member 50 of the holder while the lower right-hand corner of the cards lowers further on the part of holder member 51 which is marked 104' in Fig. 4, securely holding the selected cards in an upper position in the holder and so offset to the left of other cards, which remain supported by the frame rails 74 and 78 until elevated approximately ⅛ inch by the lower members of holders indicated at 50' returning to normal upper position in the tray at which time the selected cards are still supported in the upper position which is sufficient to permit the legends at the top of the cards to be read without obstruction by other cards.

Just before the operating lever reaches the end of its forward movement the stud 134 (Fig. 6) strikes the lower arm 133 of lever 131, causing the upper end of the lever to engage rod 127 and pulls the bail 120 out of engagement with the shoulders 119 of such selection keys as had previously been depressed, thereby permitting the selection keys to snap back to upper position. In the movement of the operating handle the spring 114 was placed under tension, thereby drawing blade 112 against the rear ends of operatively positioned selection rails, which are returned to position immediately upon release of the depressed selection keys through the action of spring 114 on link 113, shaft 111, rock-arm 112' and blade 112.

Toward the end of the forward movement of the operating lever the locking bail 149 is moved out of the way of the rejection keys 136 by the action of arm 149' on shaft 81, at which time also the cam 156 is moved clock-wise in Fig. 5 to permit the cylinder 152 to fall down out of the way of legs 157 of the rejection keys. If the rejection keys are to be used any one of them is depressed while the operating handle is at its lowermost position. Depression of any rejection key forces the corresponding operating slide 145 backward in the mechanism case and tilts the rejection rail 142 due to the action of the cams 148, said rejection rail having previously been elevated into position to engage teeth 69 of the cards by the coaction of pins 146 and slots 147. If the rejection rails are so operated a large number of the selected cards will be returned into the mass, it being understood that at this time the detent 74 is out of operative position as illustrated in Fig. 10.

Upon return of the operating handle the cam 156 elevates the cylinder 152 to force upward any depressed rejection key, the withdrawal of stud 134 from lever 131 leaving the lever free to return to normal inoperative position.

At this time there may be a large number of cards in elevated offset position. For a further selection the return keys 164 and 181 (Fig. 1) may be operated in such number or sequence as may be desired, the operation of any of these return keys causing its return rail 158 to bear against such cards as do not have notches 64 at the corresponding elevation and forcing them back into the mass. It will be remembered that at this time the arms 99 which carry detent 74 have been forced down by abutments 103 so that the cards are free to be moved to the right into the mass. It will usually be possible by performing the operations above indicated, to reduce the number of offset cards to a single one or to a very few such as can readily be withdrawn from their place in the set and subjected to further examination. It will be obvious also that after return of certain cards by means of the return keys all the cards can be lowered again by manipulating the operating handle to lower the card holder (the offset cards remaining in an offset position) whereupon a rejection key may be operated if desired for making a further rejection at this time.

At any time when it is desired to return all offset cards to normal position, they may be so returned by operating the full return key 182, the card holder being in its normal elevated position. When this return key is operated the return rail 159 will be lowered by reason of the lowering of the arm 184, thus bringing it into a position where none of the cards have side notches 64. Upon further depression of the key its inclined cam projection 180 will act on the lug 178 of the adjacent rock-arm, thus oscillating shaft 174, the movement of which is transmitted through rock-arms 173 and 172 to the return rail 159 thus returning all cards to normal position.

It will be obvious to those skilled in the art that my device can be changed in many respects without departing from the spirit of the invention and therefore I do not limit myself to the structure shown in the drawings and described in the specification but only as indicated in the appended claims.

Having thus fully described my said invention, what I claim as new and desire to secure by Letters Patent is:

1. In a card-indexing mechanism, a set of cards having selective irregularities, a holder therefor, a mechanism support, card-selecting means carried by said support said selecting means including a set of selection rails, a bank of keys, means operable by each key for selectively positioning a selection rail relatively to cards in the holder, means for producing relative movement between the holder and the operatively positioned selection rails to offset desired cards of the set, means for returning the keys to normal position, and means for independently returning the selection rails to idle position.

2. A device as in claim 1, said last-named means including individual springs connected to the respective selection rails.

3. In a card-indexing mechanism, a set of cards having selective irregularities, a holder therefor, a mechanism support, card-selecting means on said support including a set of selection rails, a bank of keys, means operable by each key for selectively positioning a selection rail relatively to cards in the holder, an operating handle, connections between said handle and said holder for producing relative movement between the holder and the operatively positioned selection rails to offset desired cards of the set, means for returning the keys to normal position, means for independently returning the selection rails to idle position, said means including a blade positioned to engage operatively positioned selection rails, and connections from said operating handle to said blade for actuating the blade consequently on a movement of said handle.

4. In a card-indexing mechanism, a set of cards having variably located teeth along an edge thereof, a holder therefor, card-selecting means supporting said holder including a set of selection rails, a bank of keys, means operable by each of said keys for selectively positioning a selection rail relatively to cards in the holder, means for locking down the keys of selected rails, an operating handle connected to the card holder for moving the cards transversely of the selection rails, means operated by the movement of the operating handle for releasing said locking means, and means also operated by said operating handle for returning operatively positioned selection rails to idle position.

5. In an indexing mechanism, a set of cards having variably located selective irregularities along an edge, a mechanism case provided with a series of selection rails extending lengthwise of the set of cards, means for producing relative to-and-fro movement of the cards transversely of the selection rails, means for selectively moving the selection rails into the path of the selective irregularities on the cards for offsetting desired cards relatively to others of the set during such a relative movement, rejection rails, means for causing the rejection rails to act selectively on certain of said selective irregularities for returning offset cards to normal position and means for locking the rejection rails out of action until after the selection rails have been returned to inactive position, substantially as set forth.

6. In a card indexing mechanism, a set of cards having selective irregularities, mechanism-supporting means provided with a series of selection rails selectively movable into position to offset desired cards of the set, a series of rejection rails movable selectively into position to return offset cards to normal position in the set, means for causing relative movement between the set of cards and said rails, and means for preventing selective operation of the rejection rails until after completion of the offsetting by the selection rails.

7. In a card indexing mechanism, a set of cards, means operatively located with respect to said set for moving said set of cards bodily in effecting selecting operations, a set of rails, movable keys for actuating said rails, and means operated by said first-named means for positively returning said keys.

8. In a card indexing mechanism, a set of cards having selective irregularities, a frame, card-selecting means on the frame including a set of rails extending lengthwise of the set, means for causing relative movement of the cards and the rails, said means including an oscillatory lever, keys for selectively moving said rails into operative relation to the cards to offset desired cards relatively to others of the set, and means operated by said lever for positively returning said keys to normal position.

9. A device as in claim 8, said rails being connected to said keys so as to be returned to idle position upon return of said keys.

10. In a card indexing mechanism, a set of cards having selecting means thereon, a frame, card-selecting means on the frame coacting with said means on the cards including a set of rails extending lengthwise of the set, means for causing relative movement of the cards and said rails, said means including an oscillatory lever, keys for selectively bringing said rails into operative relation to the cards for moving desired cards transversely of the set, individual springs for returning the keys to normal position, and means operated by said lever for positively returning said keys to normal position.

11. In a card indexing mechanism, a set of cards embodying selecting means, a frame, and card-selecting means on the frame including means for offsetting desired cards of the set, said cards having notches in an edge thereof, a return bar movable into a position to return all offset cards, a return key for actuating the bar when in such position, means on said key for normally holding the bar in a position opposite notches in some of the cards of the set, and means for operating the bar when in the last-named position for returning offset cards selectively.

12. In a card indexing mechanism, a set of cards, means in operative relation to said set for offsetting desired cards thereof, and means whereby said offset cards may be returned toward normal position either selectively or collectively.

13. In a card indexing mechanism, a set of cards, means in operative relation to said set for offsetting desired cards thereof, an element extending alongside said set, means for positioning said element variably, means on said cards for coacting with said element in each of its positions, and means whereby said element may be actuated for moving offset cards toward normal position in the set by its action on said coacting means.

14. In a card indexing mechanism, a set of cards embodying selecting means, a frame, card-selecting means on the frame including means for offsetting desired cards of the set, said cards having notches in an edge thereof, a return bar, means for placing the bar either in a position opposite notches in certain of the cards or in another position where no cards are notched, means for actuating the return bar in its first position for returning cards selectively, and independent means for actuating the return bar in its second position for returning all offset cards.

15. In a card indexing mechanism, a set of cards having selective irregularities along an edge of individual cards, means in operative relation thereto for moving said set bodily laterally, means coacting with said selective irregularities for retarding the movement of selected cards to offset them with reference to the other cards, and means for thereafter offsetting selected cards to a greater extent.

16. In a card indexing mechanism, a set of cards including cards each having selective irregularities along an edge thereof, and means in operative relation thereto for offsetting a card incrementally by successive steps in the same direction with reference to the other cards of the set.

17. In a card indexing mechanism, a mechanism case, a card tray thereon, a card holder in the tray, cards in the holder with notches adjacent a lower corner and selective irregularities along an edge, rails extending lengthwise of the machine and movable selectively into position for selective engagement with such irregularities on the cards in the holder, means for imparting an angular movement to the holder followed by a lateral movement for offsetting desired cards by engagement with operatively positioned rails, a detent on the holder, and means for moving the detent into engagement with the notches on offset cards to offset them further during the return lateral movement of the holder.

18. A device as in claim 17, in combination with means for retracting said detent from the cards as the holder approaches normal position.

19. In a card indexing mechanism, a card tray, a card holder thereon, cards therein having variably located teeth on a lower margin and having selective irregularities on a vertical margin, means for moving the holder downward and sidewise, means adapted to be selectively positioned for engaging such teeth to offset desired cards by the movement of the holder, means adapted to be positioned selectively for returning offset cards to normal position, a detent for engaging non-returned cards to offset them further in the return movement of the holder, and means for retracting said detent from the cards when the holder is in its lowermost position.

20. In a card indexing mechanism, a card tray, a card holder thereon, cards therein having variably located teeth on their lower margin, means for moving the holder downward and sidewise, means adapted to be selectively positioned for engaging such teeth to offset desired cards by the movement of the holder, means adapted to be positioned selectively for returning offset cards to normal position said cards having selective edge structure for coacting with said last-named means, a detent for engaging non-returned cards to offset them further in the return movement of the holder, and means for retracting said detent from the cards when the holder is in its uppermost position.

21. In a card indexing mechanism, a mechanism case, a card tray therein, a card holder on the tray, a shaft, actuating means on the shaft, fixed means on the holder engaged by said actuating means to move the holder, means operated by the shaft for locking the holder in idle position, and means for rocking said shaft to first release the holder and then to impart motion to the same.

22. In a card indexing mechanism, a mechanism case, a card tray therein, a card holder on the tray, a shaft extending lengthwise of the case, horns on the shaft, fixed means on the holder engaged by said horns to move the holder, there being a flat face on a horn coacting with said fixed means for supporting the holder in idle or normal position, and means for rocking the shaft.

23. In a card indexing mechanism, a mechanism case, a tray thereon, a card holder supported by the tray, cards in the holder, means for imparting to the card holder a diagonal downward movement followed by a lateral movement, said means including a rock shaft having means to engage the holder, means on the tray for arresting the downward movement of the cards before the end of the downward movement of the holder, said means permitting the cards to be moved laterally upon lateral movement of the holder, means on the mechanism case for offsetting cards selectively in connection with such movements of the holder, and means on the holder for engaging offset cards to offset them farther during the return lateral movement of the holder.

24. A device as in claim 23, said last-named means including a movable detent, and means on said rockshaft for removing the detent from card-engaging position during downward movement of the holder.

25. In a card indexing mechanism, a frame, card-selecting means on the frame including a bank of depressible keys each having a shoulder with a horizontal upper face, a locking bail for holding depressed keys down including a rod having a quarter-circle slot providing a horizontal face for engagement with said faces on the shoulders of the keys, and means for elevating depressed keys.

26. In a card index, a card having a marginal attachment of metal, a set of teeth on said attachment, said attachment having a series of holes, and an attachable tooth having an ear positioned to engage in one of said holes.

27. In a card selecting mechanism, a set of cards, means for holding said set of cards, means operatively located with respect to said cards for offsetting desired cards of the set, and means positioned to act selectively on a side edge of offset cards for moving them endwise toward normal position in the set.

28. In a card indexing mechanism, a set of cards, a frame, means on the frame for offsetting desired cards of the set, said cards having notches in the edge that is exposed by offsetting the card, and a plurality of return rails movable selectively against offset cards to return into the set such cards as do not have notches opposite an actuated return rail.

29. In a card indexing mechanism, a set of cards, means for offsetting desired cards of the set, said cards having notches in an edge that is exposed by offsetting the card, a plurality of return rails movable against offset cards to return into the set such cards as do not have notches opposite an actuated return rail, and keys having fins with cam edges in coacting relation to edges on said return rails for actuating said rails.

30. In a card index, a card comprising a uniplanar sheet of fibrous material, and a uniplanar sheet-metal margin member attached thereto said member lying at least mainly in the plane of the card and having selective irregularities in the plane of the card, substantially as set forth.

31. In a card index, a card comprising a uniplanar sheet of readily destructible material, and a marginal uniplanar portion of relatively indestructible material secured to the said sheet and provided with selective marginal irregularities.

32. In a card index, a card comprising a single thickness of fibrous material, and a marginal portion secured thereto consisting of a single thickness of metal with selective irregularities thereon.

33. In a card index, a card comprising a single thickness of fibrous material, and a base secured thereto consisting of a flat sheet of metal partly overlapping the card and secured thereto, the free portions of the card and base being offset to bring them into a common plane and the base having teeth in said plane.

34. In a card index, a card having a marginal attachment of metal, integral teeth projecting from said marginal attachment, and means on the card providing for ready attachment of a repair tooth.

35. In a card indexing mechanism, keys provided with means for automatically moving them in one direction, and with means for restraining them against movement comprising faces correspondingly located on said keys, and a rod movable toward and from said keys, said rod being reduced to provide a face for engagement with said faces on said keys.

36. In a card index, a card of readily destructible material having a metallic margin member with perforations adjacent an edge thereof, separate teeth for attachment to said margin member, and an ear on each tooth adapted to enter a perforation for locating the tooth with respect to the card.

37. In a card index, a set of cards including cards each having selective irregularities along an edge thereof, means for moving said set bodily laterally, means coacting with said irregularities for selectively retarding individual cards, and means for moving retarded cards selectively for farther exposing them.

38. In a card index, a set of cards, means for offsetting cards selectively from said set, and elements alongside said set of cards adapted to be actuated for selectively returning offset cards to normal position in said set.

39. A method of card selection comprising imparting a movement of translation to an entire set of cards, mechanically obstructing the movement of desired cards in the set to offset them relatively to the remaining cards of the set, and thereafter mechanically offsetting said desired cards to a farther extent.

DONALD A. NEVIN.